United States Patent [19]

Dan et al.

[11] Patent Number: 5,787,472
[45] Date of Patent: Jul. 28, 1998

[54] DISK CACHING SYSTEM FOR SELECTIVELY PROVIDING INTERVAL CACHING OR SEGMENT CACHING OF VIDED DATA

[75] Inventors: Asit Dan, West Harrison; Dinkar Sitaram, Yorktown Heights, both of N.Y.

[73] Assignee: IBM Corporation, Armonk, N.Y.

[21] Appl. No.: 509,312

[22] Filed: Jul. 31, 1995

[51] Int. Cl.$^6$ .............................. G06F 12/12; H04N 7/10
[52] U.S. Cl. ................. 711/134; 711/112; 711/129; 711/133; 711/159; 711/170; 348/7
[58] Field of Search ..................... 348/7, 12, 13; 395/446, 456, 460, 461, 462, 463, 465, 486, 487, 419, 200.9; 455/5.1; 711/112, 129, 133, 134, 159, 170

[56] References Cited

U.S. PATENT DOCUMENTS

| | | | |
|---|---|---|---|
| 4,414,644 | 11/1983 | Tayler | 711/112 |
| 4,433,374 | 2/1984 | Hanson et al. | 711/138 |
| 4,530,055 | 7/1985 | Hamstra et al. | 711/136 |
| 4,713,755 | 12/1987 | Worley, Jr. et al. | 711/123 |
| 4,928,239 | 5/1990 | Baum et al. | 711/136 |
| 4,947,316 | 8/1990 | Fisk et al. | 395/285 |
| 4,998,221 | 3/1991 | Correale, Jr. | 365/187.07 |
| 5,293,609 | 3/1994 | Shih et al. | 711/137 |
| 5,394,531 | 2/1995 | Smith | 711/136 |
| 5,414,455 | 5/1995 | Hooper et al. | 348/7 |
| 5,420,983 | 5/1995 | Noya et al. | 395/850 |
| 5,434,992 | 7/1995 | Mattson | 711/119 |
| 5,442,390 | 8/1995 | Hopper et al. | 348/7 |
| 5,450,562 | 9/1995 | Rosenberg et al. | 711/119 |
| 5,452,440 | 9/1995 | Salsburg | 711/136 |
| 5,499,354 | 3/1996 | Aschoff et al. | 711/129 |
| 5,513,336 | 4/1996 | Vishlitzky et al. | 711/136 |
| 5,526,511 | 6/1996 | Swenson et al. | 711/134 |
| 5,542,066 | 7/1996 | Mattson et al. | 711/136 |
| 5,586,264 | 12/1996 | Belknap et al. | 395/200.08 |
| 5,678,024 | 10/1997 | Wagar et al. | 711/129 |
| 5,737,750 | 4/1998 | Kumar et al. | 711/129 |

OTHER PUBLICATIONS

Dan, A.; Dias, D.; Mukherjee, R.; Sitaram, D.; Tewari, R.; IMB; "Buffering and Caching in Large–Scale Video Servers", Compcon '95, IEEE Comp. Soc. Press; pp. 217–224, Mar. 1995.

Jean-Paul Nussbaumer et al., "Networking Requirements for Interactive Video on Demand" IEEE Journal on Selected Areas in Communications, vol. 13, Issue 5, Jun. 1995, pp. 779–787.

Christos Papadimitriou. et al., "Information Caching for Delivery of Personalized Video Programs on Home Entertainment Channels", Internation Conference on Multimedia, 1994, pp. 214–223.

Phillip Lougher, "The Impact of Digital Audio and Video on High–Speed Storage", 13$^{th}$ IEEE Symposium on Mass Storage Systems, 1994, pp. 84–89.

Primary Examiner—Eddie P. Chan
Assistant Examiner—Hong C. Kim
Attorney, Agent, or Firm—Kevin M. Jordan; Anne Vachon Dougherty; Richard M. Ludwin

[57] ABSTRACT

A system and method for caching sequential data streams in a cache storage device. For each information stream, a determination is made as to whether its data blocks should discarded from cache as they are read by a consuming process. Responsive to a determination that the data blocks of a stream should be discarded from the cache are read by the consuming process, the data blocks associated with that stream are cached in accordance with an interval caching algorithm. Alternatively, responsive to a determination that the data blocks of a stream should not be discarded from the cache storage device as they are read by the consuming process, the data blocks of that stream are cached in accordance with a segment caching algorithm.

14 Claims, 12 Drawing Sheets

FREE BLOCK ENTRY 106

INTERVAL ENTRY 122

| INTERVAL LIST 120 → | PRECEDING STR 124 | FOLLOW STR 126 | INTERVAL SIZE 128 | ALLOCATED 129 | NEXT INT 127 |
|---|---|---|---|---|---|

SEGMENT TABLE 130

| SEGMENT ID 131 | SEGMENT SIZE 133 | CACHE STATUS 132 | STATISTICS 134 |
|---|---|---|---|
| | | | |
| | | | |

STREAM TABLE 200

| STREAM ID 205 | STREAM STATE 210 | CACHE ACCESS FLAG 211 | VIDEO ID 215 | POSITION 220 |
|---|---|---|---|---|
| | | | | |
| | | | | |

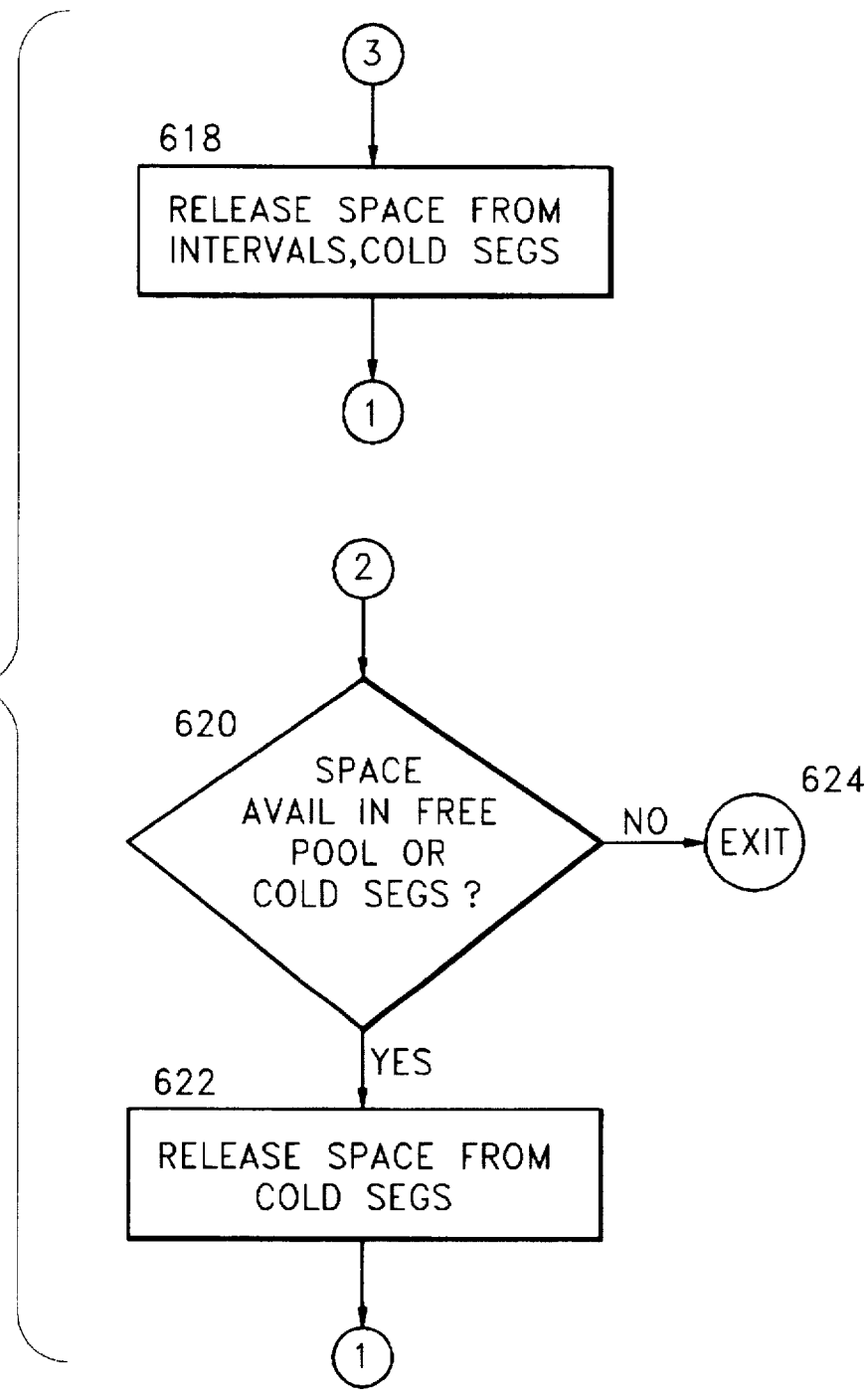

5,787,472

1

DISK CACHING SYSTEM FOR SELECTIVELY PROVIDING INTERVAL CACHING OR SEGMENT CACHING OF VIDEO DATA

I. BACKGROUND OF THE INVENTION a. Field of the Invention

The present invention relates to a movie on demand system of the type wherein multiple clients are serviced by video streams delivered from a central video server.

b. Related Art

In distributed video servers, there may be a large number of local (front-end) nodes, each serving a small number of viewers. To reduce movement of data from the remote (back-end) nodes to the front-end nodes, video files may be cached at the front-end nodes. With a smaller number of viewers per node, a relatively large amount of buffer is required to obtain significant hit ratios. Due to the large price differential between the price of memory and disks, it is preferable to use disks for buffering.

Interval caching is an effective buffering method for video-on-demand servers. However, interval caching to disk may require use of disk bandwidth for writes, reducing the number of streams that can be supported from the disk. Static caching of hot movies on disk does not require any bandwidth but is not as effective as interval caching.

II. SUMMARY OF THE INVENTION

In light of the above, in accordance with the present invention there is provided a system and method for caching sequential data streams in a cache storage device. For each information stream, a determination is made as to whether its data blocks should be discarded from cache as they are read by a consuming process. Responsive to a determination that the data blocks of a stream should be discarded from the cache as they are read by the consuming process, the data blocks associated with that stream are cached in accordance with an interval caching algorithm. Alternatively, responsive to a determination that the data blocks of a stream should not be discarded from the cache storage device as they are read by the consuming process, the data blocks of that stream are cached in accordance with a segment caching algorithm. The present invention allows the cache manager to efficiently provide requested video data to consecutive streams without requiring that the video data be retained after reading by the latter of said consecutive streams.

III. BRIEF DESCRIPTION OF THE DRAWING

FIGS. 6A–6B show the procedure used by the cache manager for allocating space to a segment; and, FIG. 7 is shows the processing, by the cache manager, of a stop request from a client.

IV. DETAILED DESCRIPTION OF A PREFERRED EMBODIMENT

Figure 1:
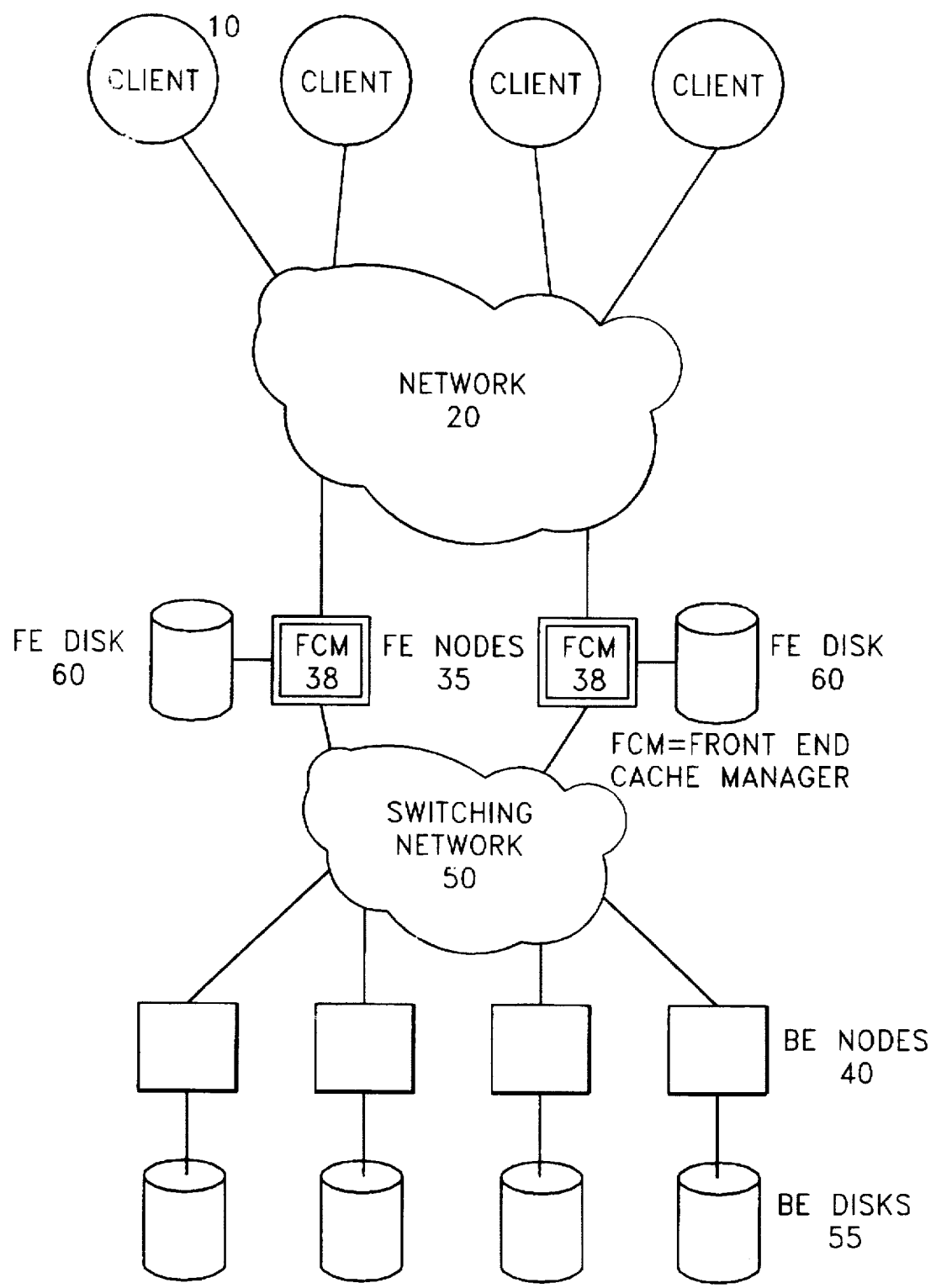
FIG. 1 is a block diagram of a video-on-demand system according to an embodiment of the present invention.

FIG. 1 is a block diagram of a video-on-demand system according to an embodiment of the present invention. It is assumed that clients 10 make requests from front-end nodes 35 via a communication network 20. Clients can submit start, stop and read requests. The front-end nodes 35 are connected to back-end nodes 40 that contain permanent copies of the videos, by way of a switching network 50. The back-end nodes have disks 55 that are used to store the permanent copies of the videos. The videos are assumed to be made up of segments. The front-end nodes have a front-end disk group 60 that can be used for caching. This disk group is managed by a front-end cache manager 38 (also referred to as the cache manager). Caching conserves server resources since the cached data does not have to be read from the back-end disks, reducing both the needed back-end disk bandwidth and the switching network capacity.

The front-end nodes can be embodied as workstations (e.g. IBM RISC SYSTEM 6000) each having a first network adapter for interconnection with the communication network 20 and a second network adapter for interconnection to the fast switching network 50. The back-end nodes can be also embodied as workstations or as larger mainframe servers (e.g. an IBM ES/9000) each having a network adapter for interconnection to the switching network 50. The communication network can be embodied as a conventional broadband network. The switching network 50 can be embodied as either a conventional broadband network or as a cluster switch. The back-end disks 55 and front-end disks 60 can be embodied as either stand alone disks or as a striped group of disks such as a RAID-5 array. The front-end cache manager 38 is preferably embodied as program code and data structures instantiated in the memory of each of the front-end nodes.

Figure 2:
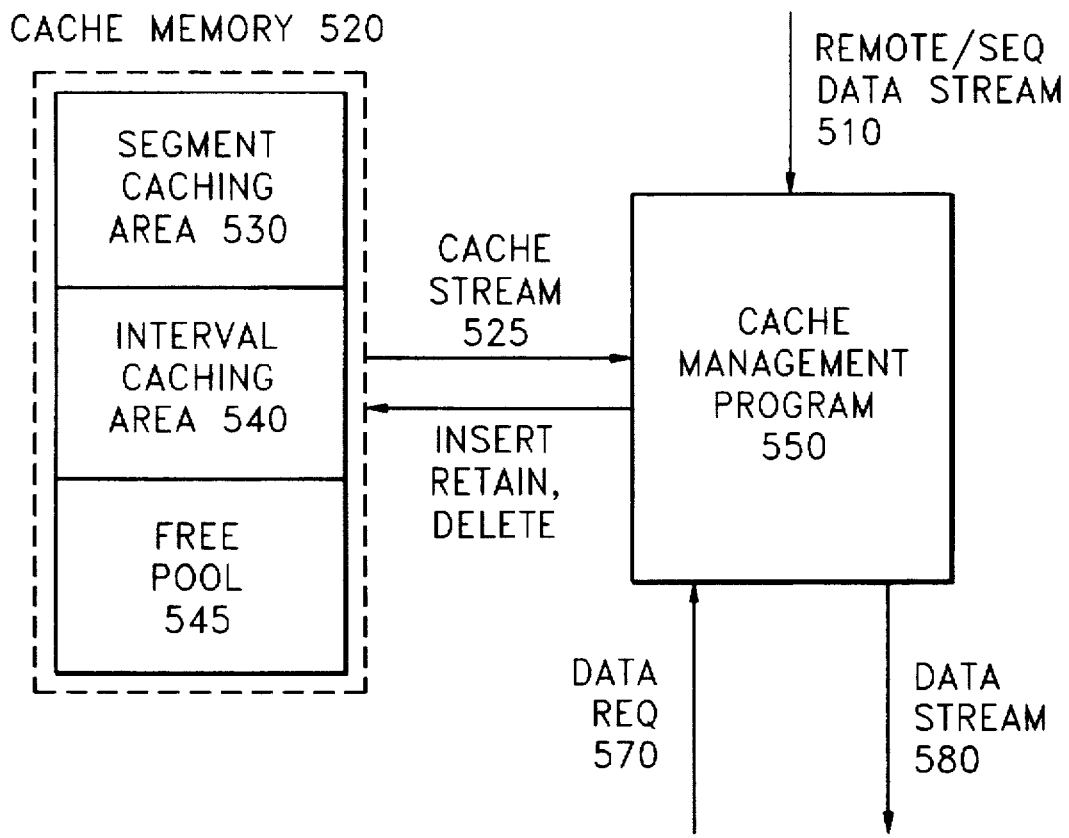
FIG. 2 is a block diagram of the front-end cache manager of FIG. 1.

FIG. 2 is a block diagram of the cache manager 38. The front-end disk group or cache memory 520 is divided into three parts. The segment caching area 530 consists of the blocks belonging to video segments that are or will be completely cached. The interval caching area 540 consists of blocks belonging to video segments that are partially cached. The free pool 545 consists of blocks that are free; i.e. do not contain data from any video. Data requests 570 are received by the cache management program 550 from users. The needed data are retrieved either from the back-end nodes 40 using a remote data stream 510 or a cache data stream 525 from the cache. After transmitting the data via a data stream 580 the cache management program may chose to insert the blocks into the cache, if the data was obtained remotely; or to retain or discard the blocks if they were retrieved from the cache.

Figure 3:
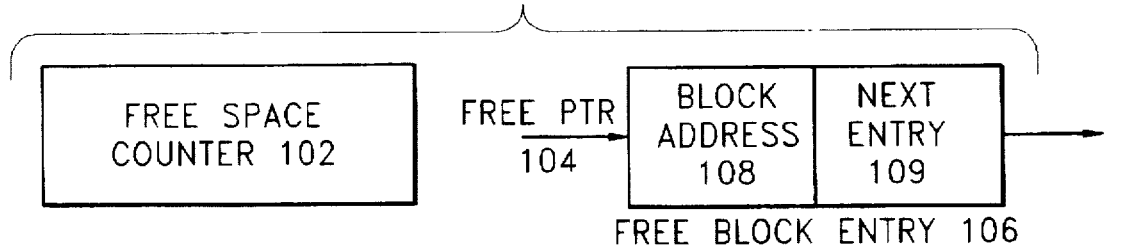
FIG. 3 shows the data structures used in the operation of the present cache management method.
Figure 3:
Figure 4A:
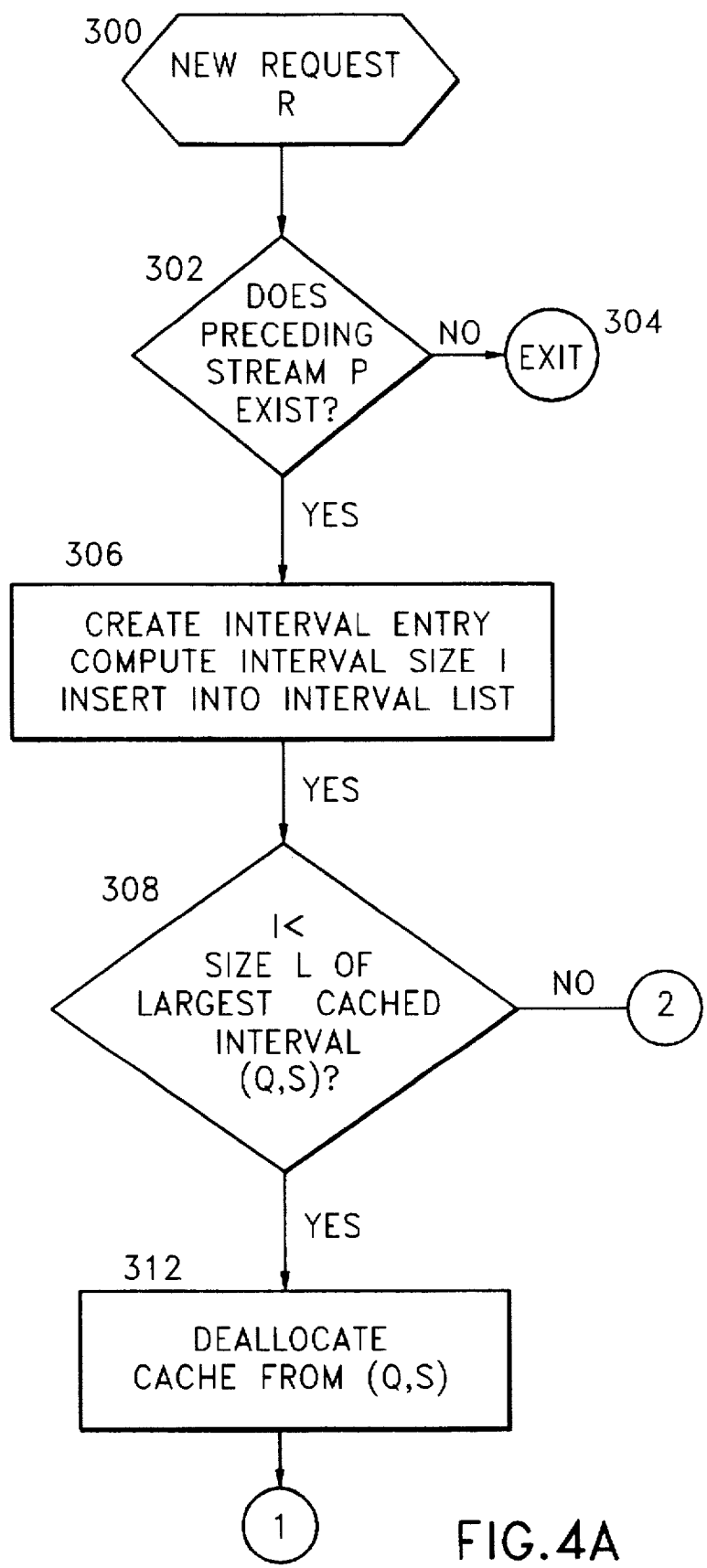
FIGS. 4A–4D show the handling, by the cache manager, of a new request for a stream made by a client.
Figure 4B:
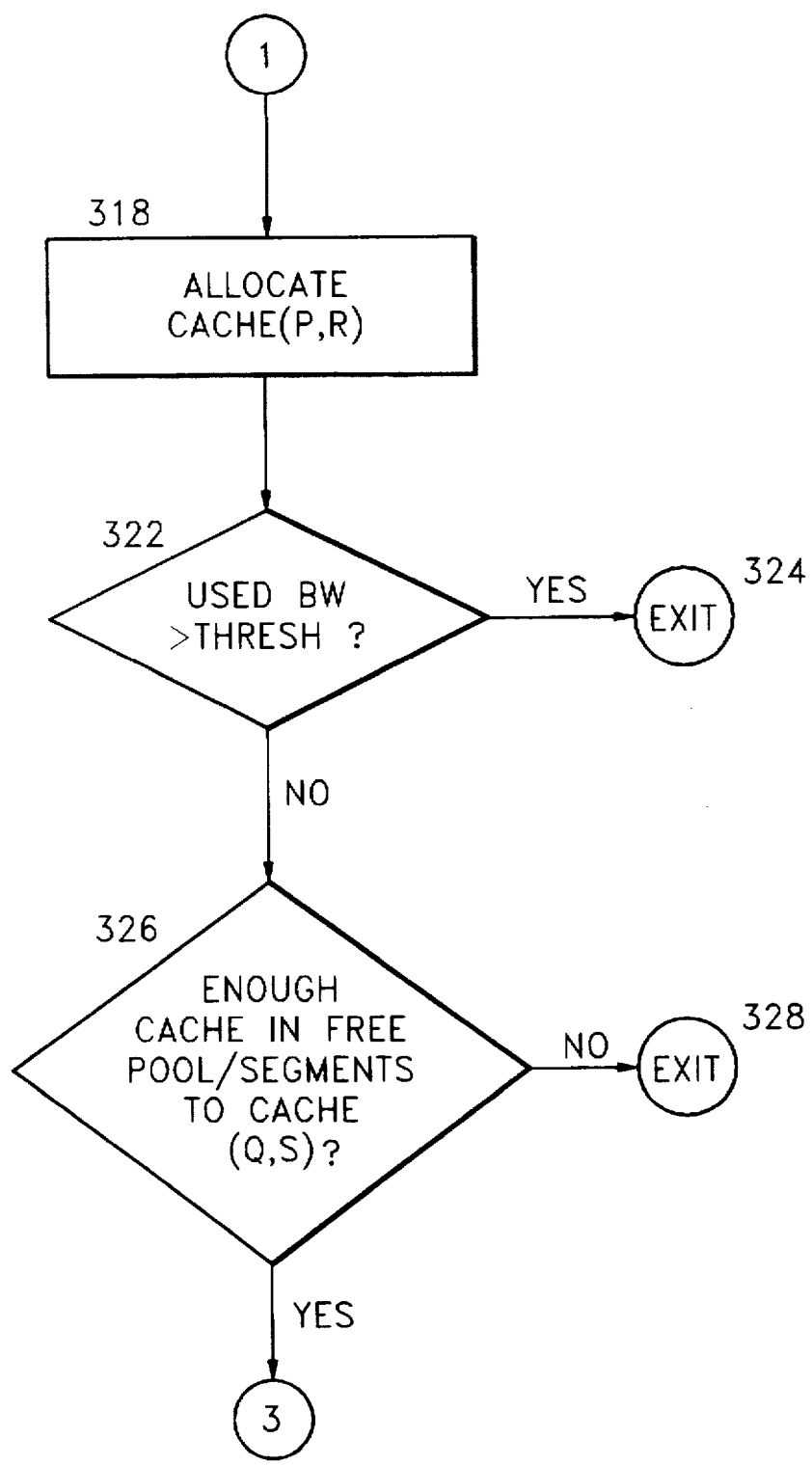
Figure 4C:
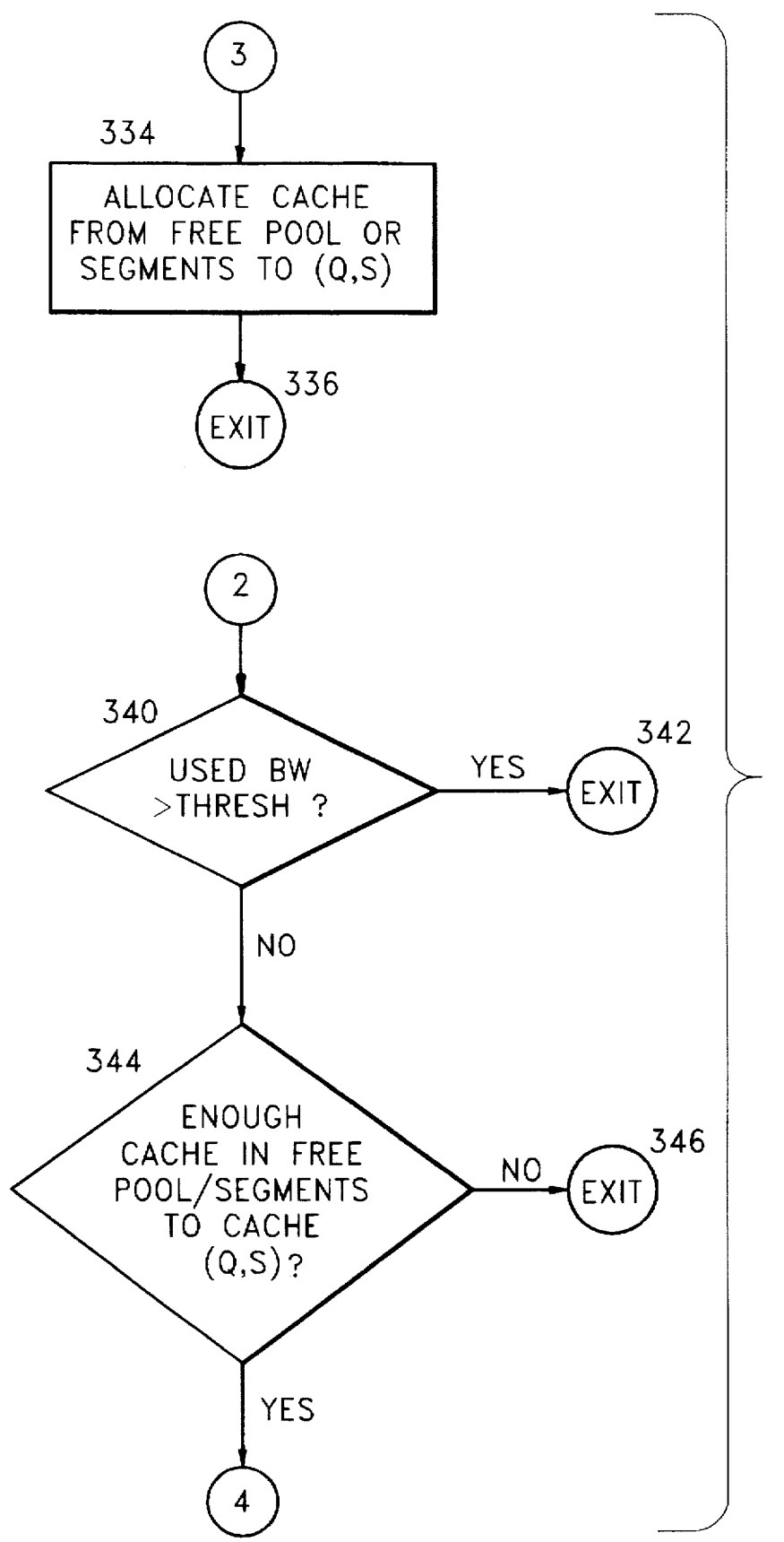

FIG. 3 shows the data structures used in the operation of the present cache management method. For managing the free pool 545, each front-end node has a free pool counter 102 that keeps track of the number of unallocated blocks in the free pool. This is initially set to equal the size of the cache memory 520. There is also a free pointer 104 that points to a list of free block entries 106 containing the address of the free block 108 and a pointer to the next free block entry 109. The used BW 110 is the total used bandwidth of the front-end disk group. The threshold 115 is used to determine whether to cache entire segments or fragments of segments. It is set to a pre-determined value close to but less than the maximum bandwidth of the front-end disk group (e.g. 80% of the maximum bandwidth).

The interval list 120 contains a list of the intervals formed by pairs of consecutive streams viewing the same video. The cache manager may decide (as described below) to serve the later stream of the pair from the cache by retaining the blocks read by the earlier stream. The list consists of interval entries 122. The preceding stream 124 of an interval entry 122 is the identifier of the earlier stream of the pair while the following stream 126 is the later stream of the pair. The interval size 128 is the number of blocks read by the preceding stream that need to be retained for use by the following stream and is equal to the distance between the two streams while reading the video file. The allocated field 129 is the number of cache blocks allocated to the interval and the next interval field 130 is a pointer to the next interval entry 122. The interval list 120 is sorted on the interval size 128.

The segment table 130 contains an entry for each video segment consisting of the segment id 131, the segment size 133 which specifies the number of cache blocks required by the segment, the cache status field 132 which specifies whether or not the segment is cached, and statistics 134 such as the inter-reference time which is used to decide whether to retain the segment in the cache. The cache status field 132 may be TRUE if the segment is cached and FALSE otherwise. The stream table 200 contains an entry for each stream. The entry consists of the stream id 205, the stream state 210, the cache access flag 211 of the stream, the video id 215 containing the id of the video being watched by the stream, and the position 220 which contains the position of the stream in the video. The stream state 210 may be RETAIN, indicating that blocks read by the stream are to be retained or DISCARD, indicating the blocks are to be discarded. The cache access flag 211 may be TRUE or FALSE to indicate that the stream is accessing (writing or reading) or not accessing the cache, respectively.

The handling of a new request R is shown in FIGS. 4A–4D. In step 302, the cache manager checks the stream table 200 to see if there is a preceding stream P for the same video. If there is no preceding stream, the cache manager exits in step 304. If there is a preceding stream, then, using the interval caching algorithm, it creates a new interval entry 122 for the interval (P,R) and computes the interval size 128 of the interval (P,R). The interval is inserted into the interval list 120. Next, in step 308, the cache manager compares I with the size of the largest cached interval (Q,S). If I is greater than or equal to the size of (Q,S), the cache manager proceeds to step 340. Otherwise, in step 312, the cache manager deallocates cache from the interval (Q,S) by setting the allocated field 129 in the interval entry to 0, incrementing the free space counter 102 by the size of (Q,S), setting the state of Q to DISCARD and adjusting the used bandwidth 110. In step 318 it allocates cache to (P,R) by setting the allocated field 129 to the interval size, decrementing the free space counter 102 by the interval size, setting the state 210 of P is set to RETAIN, and incrementing the used bandwidth of the cache 110. In step 322, the used bandwidth 110 is compared to the threshold 115. If the used bandwidth 110 is greater or equal to the threshold 115, the cache manager exits in step 324. Otherwise, the cache manager checks in step 326 if there is sufficient cache in the free pool 545 and the segment caching area 530 to cache the interval (Q, S). If there is not sufficient cache, the cache manager exits in step 328. Otherwise, in step 334, the cache manager allocates cache from the free pool 545 and the segment caching area 530 to the interval (Q,S) and exits in step 336.

The cache manager executes step 340 from step 308 if I, the size of interval (P,R) is greater than or equal to the size of the largest cached interval (Q,S). In step 340, the cache manager checks if the used bandwidth 110 is greater than the threshold 115. If it is greater, the cache manager exits in step 342. Otherwise, the cache manager checks if there is enough space in the free pool 545 and the segment caching area 530 to cache the interval (P,R). If sufficient cache is not available, the cache manager exits in step 346. Otherwise, in step 352, the cache manager allocates cache from the free pool 545 and segment caching area 530 to the interval (P,R) by decrementing the free pool counter 110, incrementing the allocated field 129, setting the state of P to retain and updating the used bandwidth 110. Next, the cache manager exits in step 356.

Figure 5A:
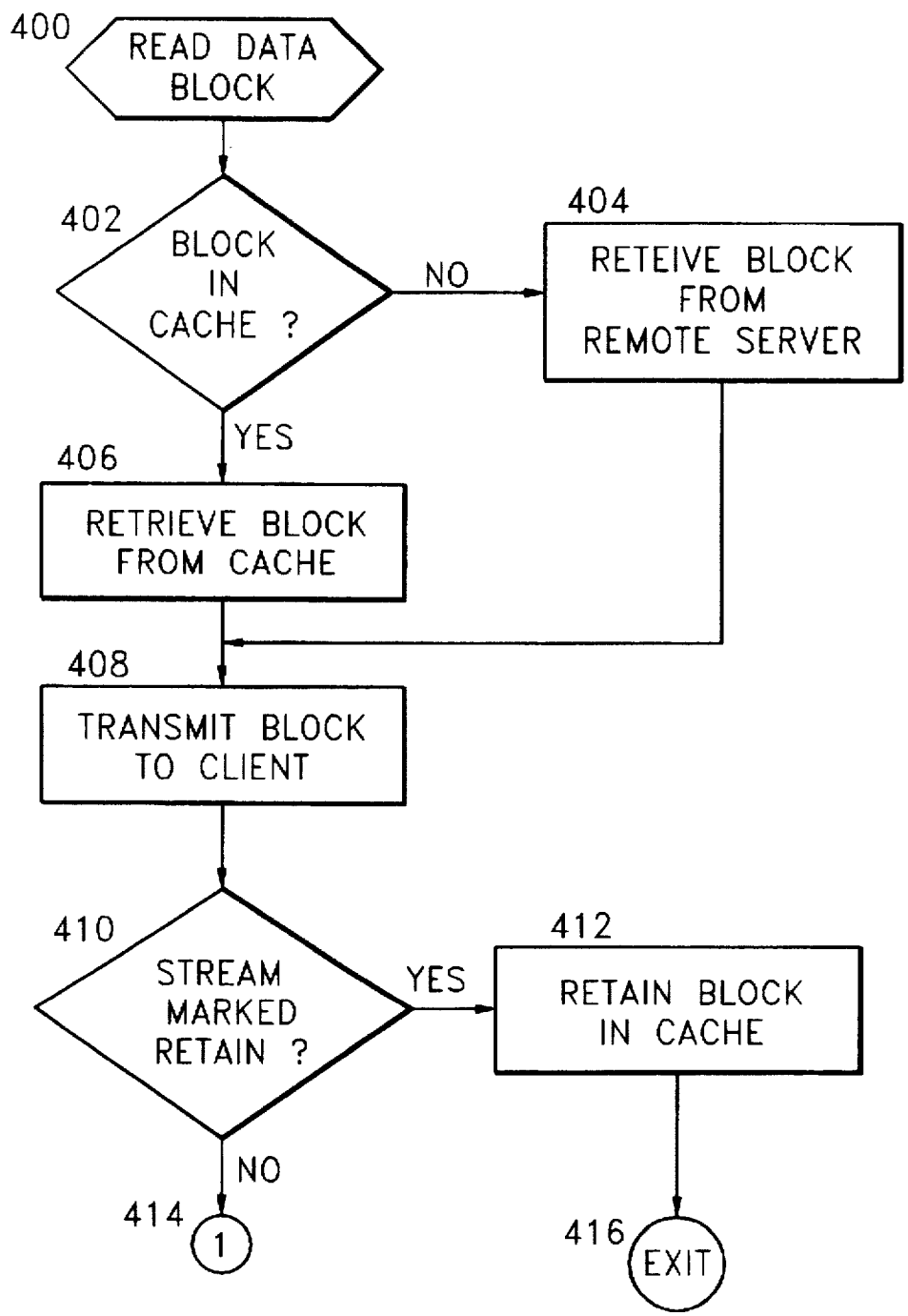
FIGS. 5A–5C show the handling, by the cache manager, of a read request made by a client.
Figure 5B:
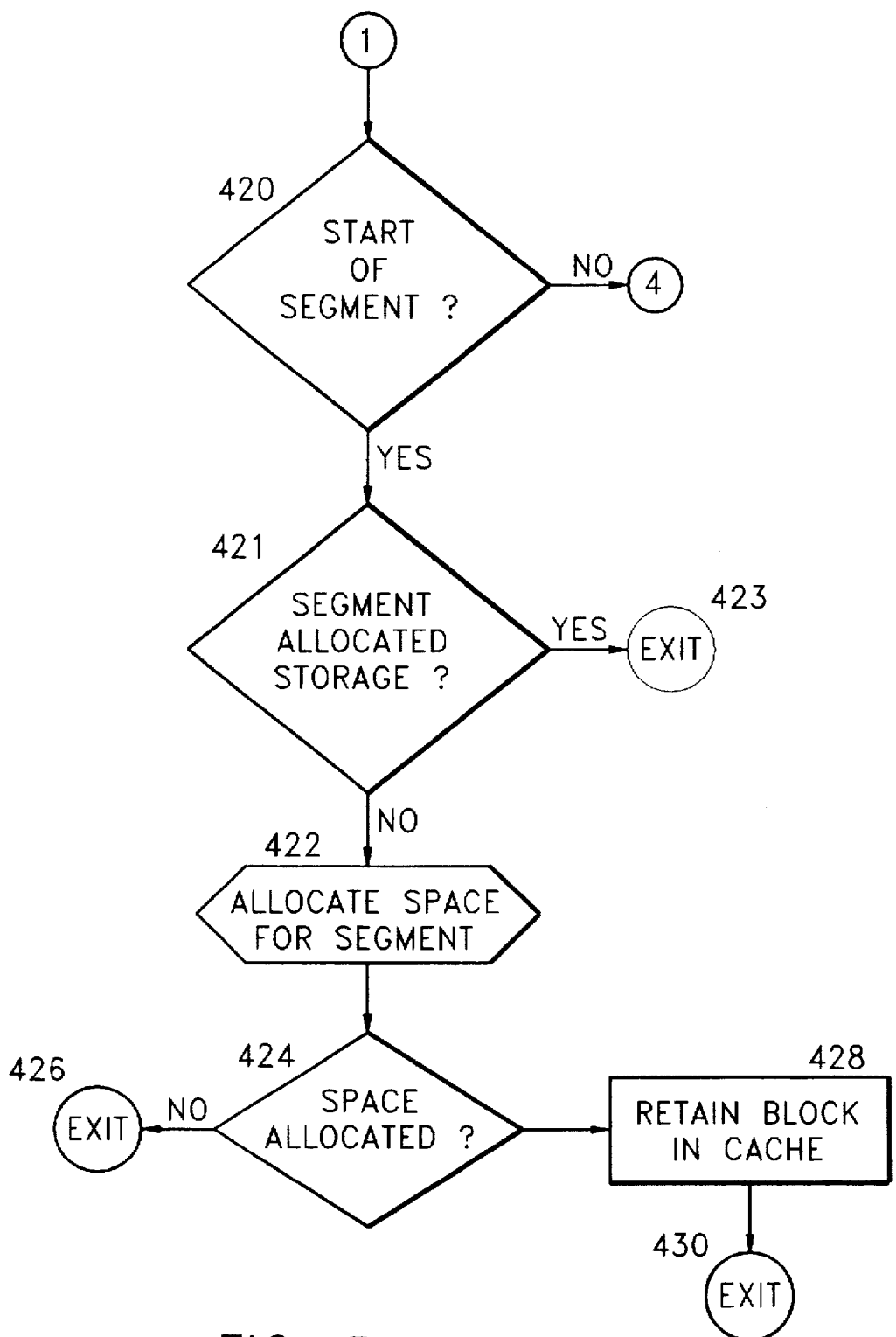
Figure 4D:
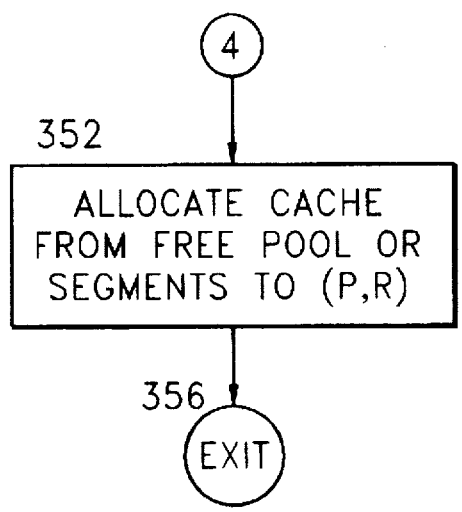
Figure 5C:
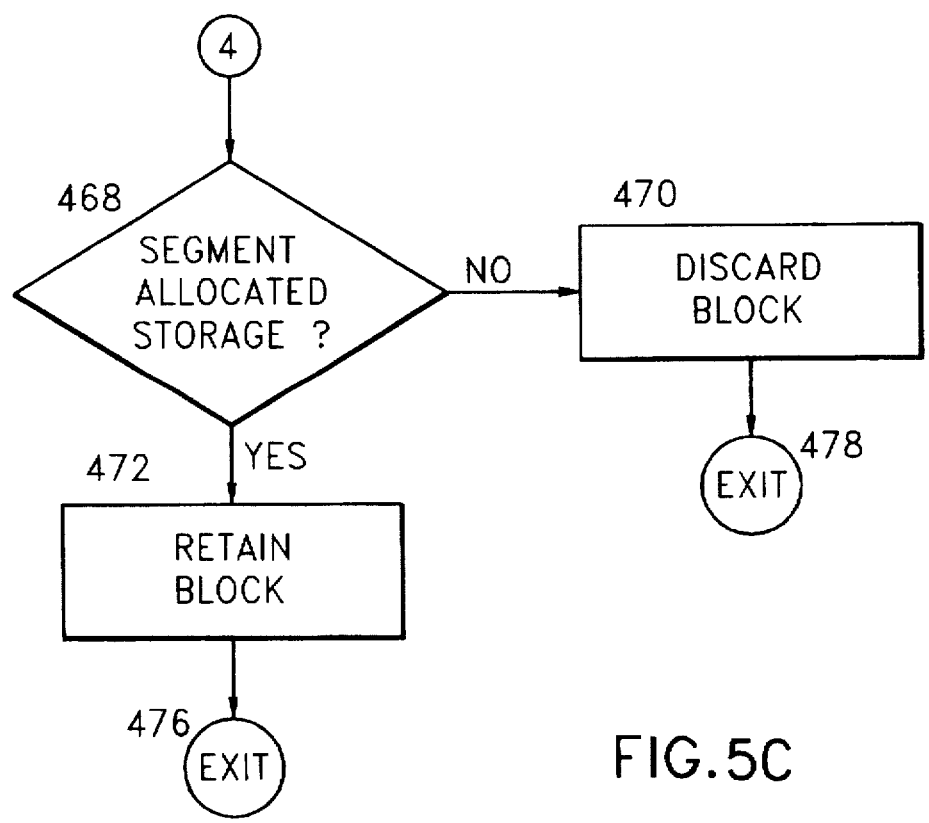

The handling of a read request is shown in FIGS. 5A–5C. In step 402, the cache manager checks if the requested block is in the cache. If it is not in the cache, in step 404 the block is retrieved from the remote server. Otherwise, the block is retrieved from the cache. In both cases, the block is transmitted to the client in step 408. In step 410, the cache manager checks if the state 210 of the stream is RETAIN. If it is, segment caching is used, the block is retained in the cache and the cache manager exits in step 416. Otherwise, with interval caching invoked, in step 420 the cache manager checks to see if the block is the first block of the segment. If not, the cache manager proceeds to step 468. If it is the initial block, the cache manager checks in step 421 if the segment has already been allocated cache storage. If so, it exits in step 423. Otherwise, in step 422 the cache manager executes the allocate space for segment procedure of FIG. 6A–6B to attempt to allocate space for caching the segment. In step 424, the cache manager checks to see if the attempt to allocate space was successful. If not, the cache manager exits in step 426. Otherwise, the block is retained in the cache in step 428 and the cache manager exits in step 430.

Step 468 is executed if the check for the start of the segment in step 420 is unsuccessful. The cache manager checks the segment cache status field 132 in the segment table 130 for the segment to determine if it has any allocated cache. If not, the block is discarded in step 470 and the cache manger exits in step 478. Otherwise, the block is retained in step 472 and the cache manager exits in step 476.

Figure 6A:
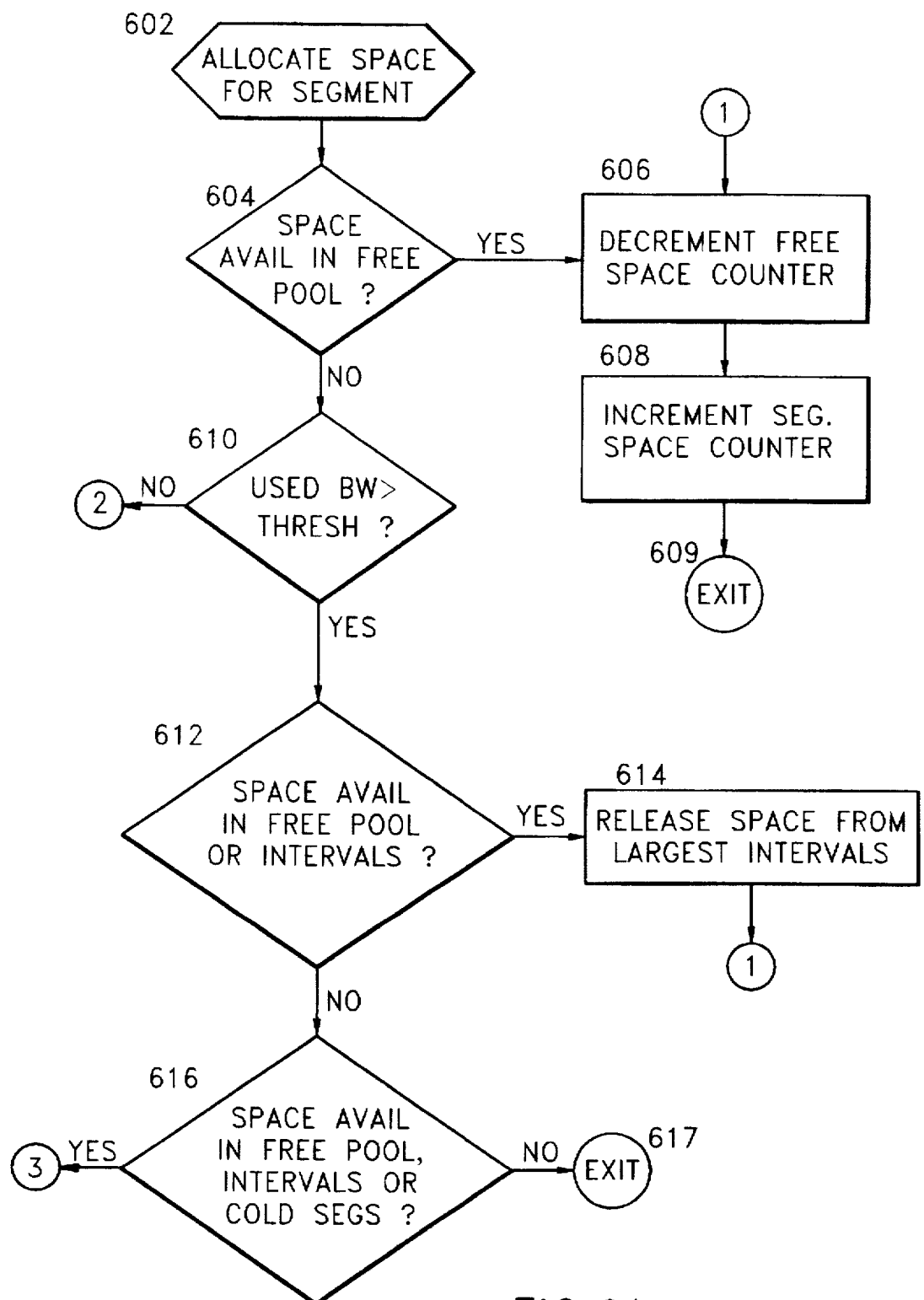

FIGS. 6A–6B show the procedure used by the cache manager for allocating space to a segment. In step 604, the cache manager checks if enough space is available in the free pool 545 for caching the segment by comparing the free pool counter 102 with the size of the segment. If enough space is available, in step 606 the cache manager decrements the free space counter 102 by the size of the segment, sets the segment cache status field 132 to TRUE and exits in step 609. Otherwise, in step 610 it compares the used bandwidth 110 with the threshold 115. If the used bandwidth 110 is less than or equal to the threshold 115, the cache manager executes step 620. Otherwise, it executes step 612 where it checks if sufficient space is available in the free pools and the interval caching area 540 to cache the segment. The space available in the free pool is found from the free pool counter and the space available in the interval caching area 540 is found by summing up the allocated fields 129 of the entries in the interval list. If sufficient space is available, the cache manager releases space from the largest intervals by setting the allocated fields 129 of the corresponding intervals to 0, setting the state 210 of the preceding streams to DISCARD and decrementing the used bandwidth 110. It then executes step 606.

If the test in step 612 fails, the cache manager checks if sufficient space to cache the segment is available in the free pool 545, the interval caching area 540 and colder, less recently accessed segments. If not, the cache manager exits in step 617. Otherwise, the cache manager executes step 618 where space is released as described above from all intervals, and from the colder segments. The cache manager then executes step 606.

If the test in step 610 fails, the cache manager checks if sufficient space to cache the segment is available in the free pool 545 and colder segments. If not, the cache manager exits in step 624. Otherwise, the cache manager releases cache from colder segments in step 622 by setting the segment cache status flag 132 of the corresponding segments to FALSE and incrementing the free space counter. It then executes step 606.

Figure 7:
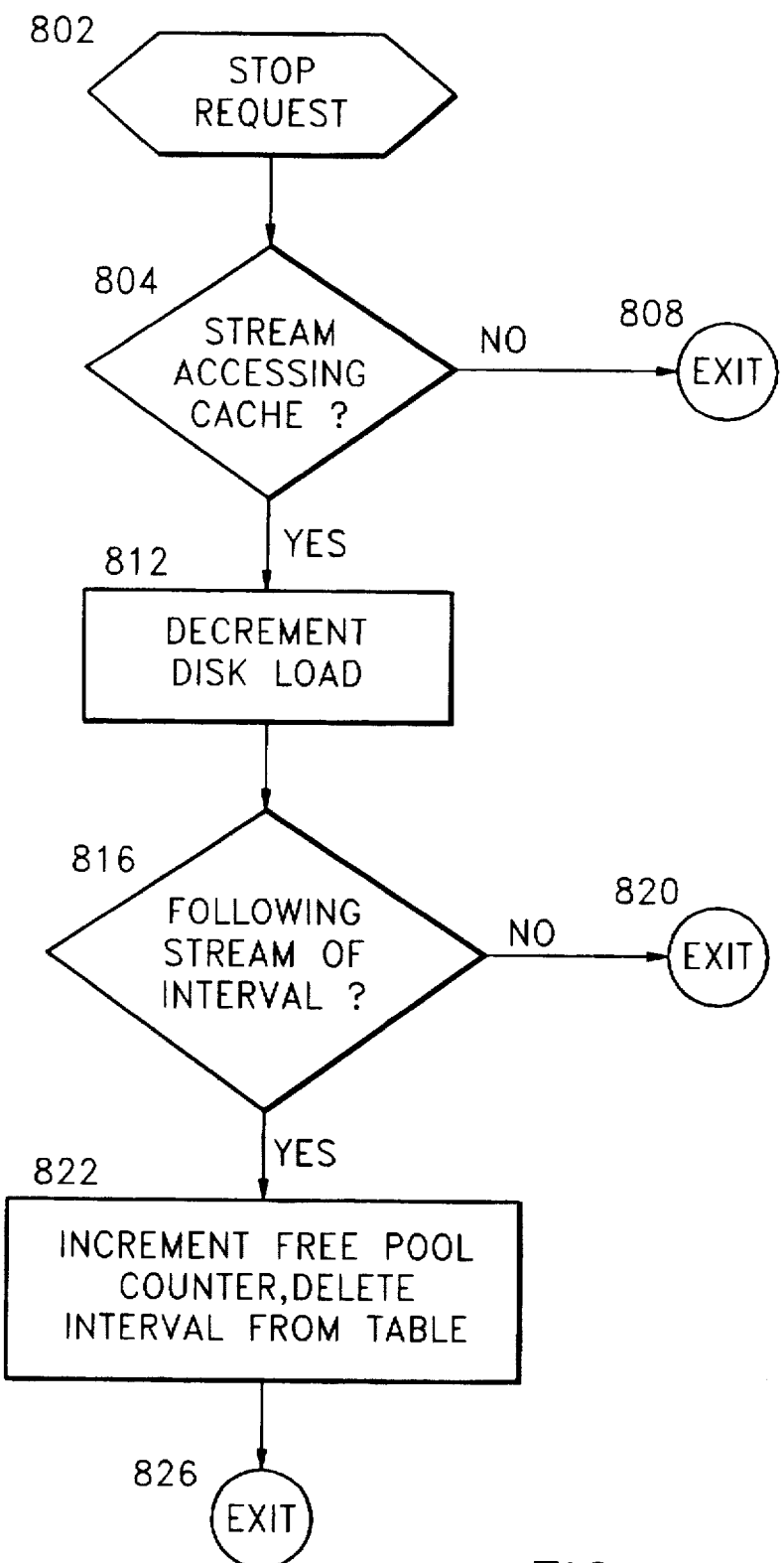

FIG. 7 is a block diagram of the processing of a stop request. In step 804, the cache manager checks the access flag 211 of the stream to decide if the stream was accessing the cache. If not, the cache manager exits in step 808. Otherwise, the used bandwidth 110 is decremented. In step 816, the cache manager checks if the stream is the following stream of an interval. If not the cache manager exits in step 820. Otherwise, the cache manager increments the free pool counter 110 by the size of the interval and deletes the interval entry 122 from the interval list 120. In step 826, the cache manager exits.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method for caching sequential data in a cache storage device having a cache manager, comprising the steps of:

said cache manager determining whether to discard data blocks associated with a given stream from the cache storage device as they are read by a consuming process;

responsive to a determination that the data blocks should be discarded from the cache storage device as they are read by the consuming process, said cache manager caching the data blocks associated with the given stream in accordance with an interval caching algorithm for use by the next successive stream prior to discarding; and responsive to a determination that the data blocks should not be discarded from the cache storage device as they are read by the consuming process, said cache manager caching the data blocks in accordance with a segment caching algorithm.

2. The method of claim 1 wherein the interval caching algorithm includes the steps of managing the data using a first caching method which continuously sequentially stores new blocks of the data in an allocated interval portion of the storage device and discards previously stored blocks of the data as they are read by the consuming process for the next successive stream, and, wherein the segment caching algorithm includes the steps of managing the data using a second caching method which retains a given segment of the data in an allocated segment portion of the storage device and discards the segment as a whole in accordance with a given algorithm.

3. The method of claim 1, comprising the further steps of: when it is determined that the data blocks should be discarded from the cache storage device as they are read by the consuming process, reallocating a portion of the cache storage device previously used for segment caching for use by the interval caching algorithm.

4. The method of claim 1, comprising the further steps of: when it is determined that given data blocks should not be discarded from the cache storage device as they are read by the consuming process, reallocating a portion of the cache storage device previously used for interval caching for use by the segment caching algorithm.

5. The method of claim 1 wherein segment cached data blocks and interval cached data blocks are simultaneously present in the cache storage.

6. The method of claim 2 comprising the further step of: when it is determined that the data blocks should be discarded from the cache storage device as they are read by the consuming process, determining if there is sufficient available space in said interval portion of said storage device for said data.

7. The method of claim 6 wherein said storage device further comprises a portion of free space and further comprising accessing free space if said determination indicates insufficient space.

8. The method of claim 6 further comprising reallocating a portion of the cache storage device previously used for segment caching for use by the interval caching algorithm if said determination indicates insufficient space.

9. A method for an automatic cache manager for locally caching sequential data provided by at least one remote server, comprising the steps of:

determining whether to locally cache data blocks from a given one of the sequential data streams;

responsive to a determination that the data blocks should not be cached, providing the data blocks to a local user from the remote server;

responsive to a determination that the data blocks should be cached:

said cache manager determining whether to discard data blocks read from a local cache storage device as they are read by a consuming process;

responsive to a determination that the data blocks should be discarded as they are read by the consuming process, said cache manager caching the data in accordance with an interval caching algorithm whereby said data blocks will be discarded after reading by the next successive process; and, responsive to a determination that the data blocks should not be discarded from the cache storage device as they are read by the consuming process, said cache manager caching the data in accordance with a segment caching algorithm.

10. A cache management method for an automatic cache manager comprising the steps of:

dynamically allocating portions of a cache memory to segment caching and interval caching respectively;

determining by the cache manager whether to discard first and second data blocks associated with a given data stream from the cache memory as they are read by the consuming process; and in accordance with the allocating and the determining:

managing transfers of said first data blocks comprising segments to and from the cache memory in accordance with a segment caching algorithm if said first data blocks should not be discarded from the cache memory as they are read by the consuming process; and managing transfers of said second data blocks each transfer comprising less than all of said second data blocks to and from the cache memory in accordance with an interval caching algorithm for use by the next successive stream prior to discarding if said second data blocks should be discarded from the cache memory as they are read by the consuming process.

11. A computer readable memory that can be used to direct a computer to perform in a particular manner when used by the computer, comprising:

means for determining whether to discard data blocks associated with a given stream from the cache storage device as they are read by a consuming process;

means, responsive to a determination that the data blocks should be discarded from the cache storage device as they are read by the consuming process, for caching the data blocks associated with the given stream in accordance with an interval caching algorithm for use by the next successive stream; and means responsive to a determination that the data blocks should not be discarded from the cache storage device as they are read by the consuming process, for caching the data blocks in accordance with a segment caching algorithm.

12. The computer readable memory of claim 11 wherein the interval caching algorithm includes means for managing the data using a first caching method which continuously stores new blocks of the data in an allocated portion of the storage device and for discarding previously stored blocks of the data as they are read by the consuming process, and, wherein the segment caching algorithm includes means for managing the data using a second caching method which retains a given segment of the data in an allocated portion of the storage device and discards the segment as a whole in accordance with a given algorithm.

13. The computer readable memory of claim 11, further comprising: means, responsive to a determination that the data blocks should be discarded from the cache storage device as they are read by the consuming process, for reallocating a portion of the cache storage device previously used for segment caching for use by the interval caching algorithm.

14. The computer readable memory of claim 11, further comprising: means responsive to a determination that given data blocks should not be discarded from the cache storage device as they are read by the consuming process, for reallocating a portion of the cache storage device previously used for interval caching for use by the segment caching algorithm.

* * * * *